United States Patent [19]

Ulrich

[11] 4,126,394

[45] Nov. 21, 1978

[54] OPTICAL CANT SENSOR FOR MORTARS

[75] Inventor: Reinhard R. Ulrich, Rockville, Md.

[73] Assignee: The United States of America as represented by the Secretary of the Army, Washington, D.C.

[21] Appl. No.: 823,079

[22] Filed: Aug. 9, 1977

[51] Int. Cl.² .................... G01B 11/26; F41G 3/16
[52] U.S. Cl. ................................ 356/152; 89/41 B; 89/41 L; 356/138; 356/153; 356/154
[58] Field of Search ............. 89/41 B, 41 L; 356/138, 356/152, 153, 154

[56] References Cited

U.S. PATENT DOCUMENTS

| | | | |
|---|---|---|---|
| 2,977,858 | 4/1961 | Jasse | 356/138 |
| 3,480,367 | 11/1969 | Husted et al. | 356/138 |
| 3,614,439 | 10/1971 | Beelik, Jr. et al. | 356/138 |
| 3,891,323 | 6/1975 | Ryan et al. | 89/41 L |

Primary Examiner—S. C. Buczinski
Attorney, Agent, or Firm—Nathan Edelberg; Robert P. Gibson; Saul Elbaum

[57] ABSTRACT

A mortar barrel is fitted with a plane mirror which reflects a first image on a viewing screen positioned in front of the mortar. A floating mirror which remains level with the ground plane is mounted to the barrel and reflects a second image on the viewing screen. Adjustment of the mortar is made for superposition of both images. After repeated firings, motar cant movement may be detected by the relative displacement of the images which requires readjustment.

5 Claims, 1 Drawing Figure

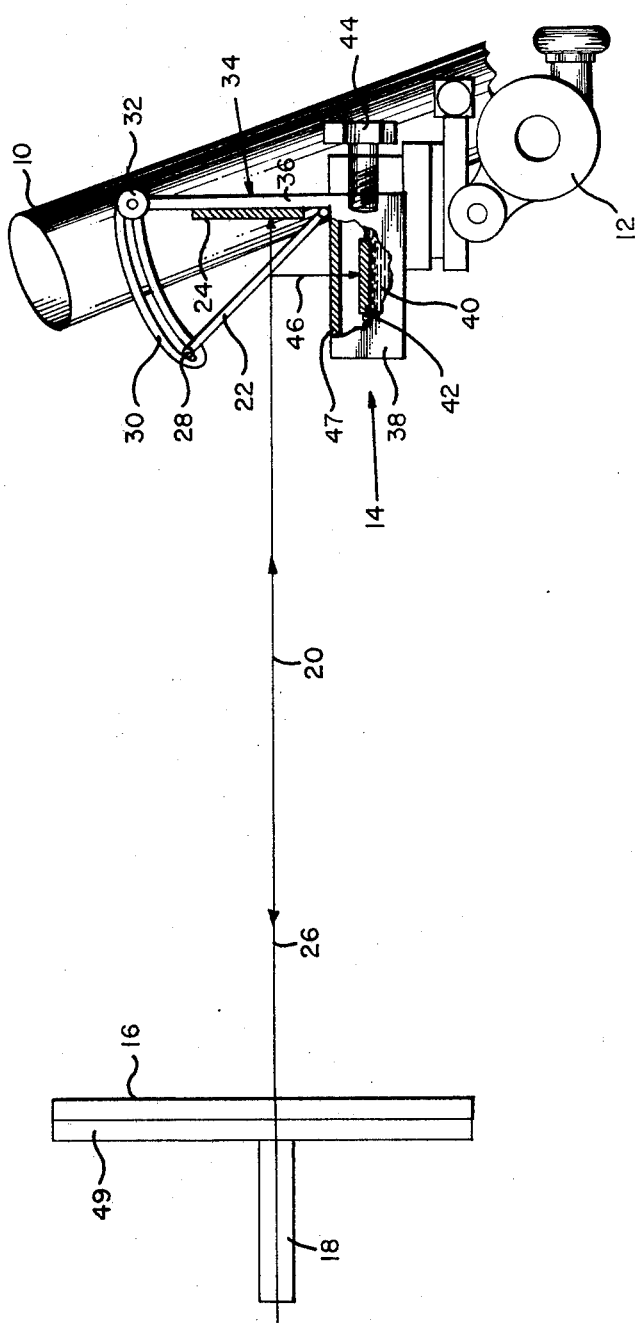

OPTICAL CANT SENSOR FOR MORTARS

RIGHTS OF THE GOVERNMENT

The invention described herein may be manufactured, used, and licensed by or for the United States Government for governmental purposes without the payment to me of any royalty thereon.

BRIEF DESCRIPTION OF THE PRIOR ART

The mortar is historically the weapon for concentrating fire in a particular area. It is usually intended to fire in the general direction of a target and fire often enough to cause injury to the target. However, the mortar-men desire to come as close as possible to the true target without adding undue cost, weight, complexity or reaction time to the mortar. Over generations, better aiming procedures have been developed and more stable tubes, base plates, and ammunition have been developed to improve the mortar's precision.

Heretofore, in order to detect changes in the orientation and provide adjustments therefor telescopic sights with vernier adjustments, aiming stakes, precision surveying equipment (aiming circles), spirit levels, and careful laying procedures have been incorporated into techniques for firing mortars. There are many significant drawbacks to the telescopic aiming stake system and other related systems. In such systems a mortarman must implace stakes about 100 meters from the mortar tube and an inner stake must be placed approximately halfway between the mortar tube and the outer stake. Moreover, when a movement in the mortar tube occurs, the mortarman generally has to guess at the correction with respect to the stakes. Because of the intricacy of the telescopic system, it is used only to spot check tube alignment during missions and it is impossible for use when rapid firing is necessitated.

Another generically related device is comprised of a cylindrical shaft having 25 percent of its surface longitudinally mirrored and using a laser diode mounted in a telescope to reflect an image therefrom. The telescope is mounted on the gun barrel and picks up the reflected beam. Any movement of the gun azimuthally may be corrected by adjusting the gun until the telescope is again aimed such that the beam appears therein at the same spot. The significant problem involved in the use of this apparatus is that only azimuthal or horizontal changes in the orientation of the gun tube may be detected and corrected. Azimuthal changes are detected by implanting the stake vertically in the ground and horizontal changes are detected by laying the stake flat on the ground. In both cases the 25 percent longitudinal mirror is oriented such that a reflection is obtained toward the telescope mounted on the mortar tube.

A major problem arises with this sytem when there is a shift in the orientation of the mortar tube such that the transmitted beam from the laser diode does not fall on either a horizontal stake or a vertically placed stake. A mortarman may detect that the orientation of the tube has changed but he does not learn the degree of such change and the degree of correction needed in order to reorient the mortar tube.

U.S. Pat. No. 3,891,323 is directed to an improvement of the prior art. The invention described in that patent is an apparatus for detecting and correcting orientation of a mortar gun barrel mounted in the earth and comprises a light source for emitting a beam of light which is reflected from a mirror or other reflecting surface mounted on the gun barrel. The reflected beam is focused on a screen some distance away from the mirror and proximate to the source of light. Basically, an observer located proximate to the mortar gun barrel can detect any changes in orientation of the gun barrel and correct accordingly by observation of the position of the focused light beam at the screen. The screen is specially designed such that the observer at the mortar gun barrel is not encumbered from the use of the apparatus by reflected sunlight. This is accomplished by a thick grid comprised mainly of holes appositioned to the screen. The design of the screen is such that it enables light from the light source to pass through it without refraction and is also comprised of translucent material such that the reflected beam may be focused thereupon.

Although the mentioned patent is an improvement over the art which preceded it, it suffers from the disadvantage of requiring cross-level adjustments after mortar firings due to the introduction of cant. As in all the prior art, the mortar cant is indicated by the position of an air bubble in a cross-level vial attached to the mortar.

BRIEF DESCRIPTION OF THE PRESENT INVENTION

The present invention is an improvement over the prior art of displaying mortar cant information. A plane mirror is mounted to a mortar barrel for movement therewith and reflects an image onto a viewing screen, as is done in the mentioned patent. However, the present invention further includes a floating mirror which maintains its level orientation with respect to a ground plane. The mortar is originally set up so that there is superposition of reflected images from the plane mirror and the floating mirror. After repeated firings, there is a displacement of the relative images and this permits simple adjustments of the mortar to again achieve superposition. There is no need for stakes as required by conventional firing techniques.

BRIEF DESCRIPTION OF THE FIGURE

The above-mentioned objects and advantages of the present invention will be more clearly understood when considered in conjunction with the accompanying drawing, in which:

The FIGURE is a side elevational view of a mortar barrel showing the mounting of the present invention thereon.

DETAILED DESCRIPTION OF THE INVENTION

Referring to the figure, reference numeral 10 generally indicates a mortar barrel. A conventional sight mount unit 12 is shown in its normal position relative to the mortar barrel. The invention consists of an optical cant sensor generally indicated by reference numeral 14.

As is the case with the previously mentioned U.S. patent, a viewing screen 16 is positioned forward of the mortar and permits a soldier to view mortar azimuth and elevation information. In the present invention the viewing screen also permits a soldier to view mortar cant information. The viewing screen includes a centrally disposed light source 18 which shines a beam of light 20 toward a 50 percent reflecting-50 percent transmitting mirror 22. Light passes through mirror 22 for impingement upon the vertically oriented plane mirror 24 which reflects light back toward the viewing screen 16 along reflected beam 26. The plane mirror 24 is mounted to flange 36 of bracket 34. The light beam 20 may be fashioned and projected by light source 18 in the shape of a cross so that a reflected cross-like image will be viewed on the screen 16.

Light along beam 20 will be reflected downwardly along beam 46 to a floating mirror 42. This mirror floats within a viscous damping fluid 40 enclosed within container 38, part of bracket 34, and always maintains its generally level orientation to the ground plane. A filter 47 may be colored green or other suitable color. The filter 47 is positioned intermediate the floating mirror 42 and mirror 22 thereby permitting the reflection of a second image along beam 26 for impingement upon the viewing screen 16. Initially, the mortar is adjusted so that there is exact superposition of the white image reflected from plane mirror 24 and the green image reflected from the floating mirror 42. This is achieved by loosening the knob 32 which permits motion of the slotted bracket 30. The upper end 28 of mirror 22 is fixed to the slotted bracket 30 so that movement of the slotted bracket 30 will achieve adjustment of the angle of mirror 22. Similarly, the adjusting knob 44 is turned to effect movement of the cant sensor relative to the mortar barrel.

Thus far, the invention has been described in terms of manual viewing of the viewing screen 16 by a soldier during operation of the mortar. However, it is possible to mount a photodetector array 49 to the rear of the viewing screen 16 which must be made for this application out of light transmitting material. The photodetector array 49 may be comprised of conventional photodetection devices and by detecting the relative displacement of both images reflected onto the viewing screen, it is possible for this data to be fed to a data processing system in the environment of automatic mortar controls which, does not per se, form part of the present invention.

Although the embodiment discussed above illustrates one suitable way for maintaining mirror 42 level with the ground plane, other mounting arrangements might also be suitable. For example, these may include mounting the mirror near the pivot point of a pendulum or suspending it by gimbals.

I wish it to be understood that I do not desire to be limited to the exact details of construction shown and described, for obvious modifications can be made by a person skilled in the art.

I claim the following:

1. An optical cant sensor for mortars comprising:
   a source of light;
   a first mirror vertically mounted to the barrel of the mortar for reflecting light from the light source;
   a viewing screen upon which the reflected light impinges;
   a second mirror mounted to the barrel for maintaining a reflecting plane level with the ground;
   a semi-reflective mirror positioned between the first and second mirrors for diverting light from the source to the second mirror, the semi-reflective mirror directing light reflected from the second mirror to the viewing screen, and for permitting light passsage between the source and viewing screen via the first mirror; and
   means for adjusting the semi-reflective mirror to superimpose images from the first and second mirrors;
   whereby repeated mortar firings produce cant which is manifest by displacement of the superimposed images.

2. The subject matter set forth in claim 1 wherein a light filter is interposed between the second mirror and the light diverter causing the coloring of one image on the viewing screen, relative to the other.

3. The subject matter set forth in claim 1 wherein the first mirror is a plane mirror.

4. The subject matter set forth in claim 3 wherein the second mirror floats on a viscous damping fluid.

5. The subject matter set forth in claim 1 together with a photodetector array mounted to the rear of the viewing screen for converting the images from both mirrors to electric signals representative of image position data.

* * * * *